(12) United States Patent
Tamme

(10) Patent No.: US 10,955,068 B2
(45) Date of Patent: Mar. 23, 2021

(54) COMPOSITE PIPELINE SLEEPER WITH HOLLOW OUTER SHELL AND RIGID INTERNAL REINFORCEMENT

(71) Applicant: Koenders Manufacturing 1997 Ltd., Englefeld (CA)

(72) Inventor: Colin Tamme, Englefeld (CA)

(73) Assignee: Koenders Manufacturing 1997 Ltd, Englefeld (CA)

( * ) Notice: Subject to any disclaimer, the term of this patent is extended or adjusted under 35 U.S.C. 154(b) by 0 days.

(21) Appl. No.: 16/244,812

(22) Filed: Jan. 10, 2019

(65) Prior Publication Data

US 2020/0224794 A1 Jul. 16, 2020

(51) Int. Cl.
| F16L 3/02 | (2006.01) |
| F16L 1/06 | (2006.01) |
| F16L 1/024 | (2006.01) |
| F16L 3/00 | (2006.01) |
| F16L 3/22 | (2006.01) |

(52) U.S. Cl.
CPC ............... *F16L 3/02* (2013.01); *F16L 1/024* (2013.01); *F16L 1/0243* (2013.01); *F16L 1/06* (2013.01); *F16L 3/00* (2013.01); *F16L 3/22* (2013.01)

(58) Field of Classification Search
CPC ....... F16L 3/00; F16L 3/02; F16L 3/22; F16L 1/024; F16L 1/0243; F16L 1/0246; F16L 1/06

See application file for complete search history.

(56) References Cited

U.S. PATENT DOCUMENTS

| 429,041 | A | * | 5/1890 | Lynch | .................. F16L 3/00 138/106 |
| 822,047 | A | * | 5/1906 | Hooper et al. | ............ F16L 3/00 285/61 |
| 2,257,421 | A | * | 9/1941 | Chester | .................. E04F 21/05 52/678 |
| 2,850,182 | A | * | 9/1958 | Tetyak | .................. F16L 3/222 206/443 |
| 3,026,076 | A | * | 3/1962 | Bender | ................. F16L 1/0246 248/49 |
| 3,980,262 | A | * | 9/1976 | Lee | ........................... F16L 3/18 248/65 |
| 4,202,090 | A | * | 5/1980 | Cook | .................. B05B 13/0405 248/49 |
| 4,241,810 | A | * | 12/1980 | Newlon | ............... B65D 81/113 188/376 |
| 4,618,114 | A | * | 10/1986 | McFarland | ............... F16L 3/13 248/220.21 |
| 4,796,540 | A | * | 1/1989 | Pelfrey | ............. B65D 19/0016 108/53.1 |
| 5,234,221 | A | * | 8/1993 | Freisleben | ............ F16J 15/106 174/92 |

(Continued)

FOREIGN PATENT DOCUMENTS

JP 07208648 A * 8/1995 ............ F16L 59/135

*Primary Examiner* — Eret C McNichols
(74) *Attorney, Agent, or Firm* — Kyle R Satterthwaite; Michael R Williams; Ade & Company Inc.

(57) ABSTRACT

A composite pipeline sleeper features a rotationally molded outer shell, and an internal reinforcement structure that is disposed within, is materially distinct from, and is more rigid than, said rotationally molded outer shell. A topside of said pipeline sleeper comprises a cradle-shaped area for seated receipt of a pipe there atop.

21 Claims, 5 Drawing Sheets

(56) References Cited

U.S. PATENT DOCUMENTS

| | | | | |
|---|---|---|---|---|
| 6,142,440 A * | 11/2000 | Gratz | ............... | A47F 7/17 |
| | | | | 108/51.11 |
| 6,520,456 B1 * | 2/2003 | Neider | ............... | F16L 3/01 |
| | | | | 248/49 |
| 6,550,741 B1 * | 4/2003 | Cottone | ............... | B60P 7/12 |
| | | | | 108/51.11 |
| 6,561,466 B1 * | 5/2003 | Myers | ............... | F16L 3/221 |
| | | | | 248/68.1 |
| 8,292,238 B2 * | 10/2012 | Wakeman | ............... | F01D 25/28 |
| | | | | 248/68.1 |
| 8,807,492 B2 * | 8/2014 | Lake | ............... | F16L 3/02 |
| | | | | 248/68.1 |
| 9,068,685 B2 * | 6/2015 | Bock | ............... | F16L 59/123 |
| 9,394,150 B2 * | 7/2016 | Bow | ............... | B66F 9/18 |
| 9,487,328 B2 * | 11/2016 | Edwards | ............... | B65D 19/44 |
| 9,726,303 B1 * | 8/2017 | Gretz | ............... | B23P 11/00 |
| 9,739,397 B2 * | 8/2017 | Pratt | ............... | F16L 1/036 |
| 9,868,622 B1 * | 1/2018 | Turner | ............... | B60T 3/00 |
| 10,047,879 B2 * | 8/2018 | Drummond | ............... | F16L 3/02 |
| 10,414,542 B2 * | 9/2019 | Schrader | ............... | B65D 19/44 |
| 2006/0131469 A1 * | 6/2006 | Roy | ............... | F16L 3/02 |
| | | | | 248/346.03 |
| 2013/0115010 A1 * | 5/2013 | Connors | ............... | F16L 1/028 |
| | | | | 405/184.4 |
| 2014/0061393 A1 * | 3/2014 | Cripps, II | ............... | F16L 3/222 |
| | | | | 248/55 |
| 2016/0221715 A1 * | 8/2016 | Pratt | ............... | F16L 1/0246 |

\* cited by examiner

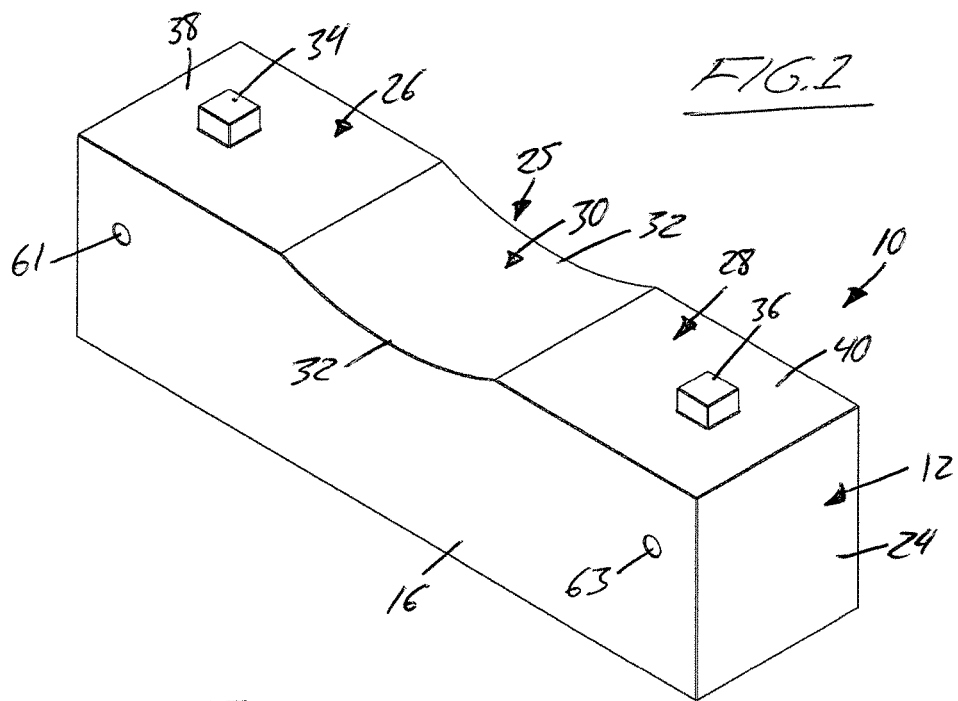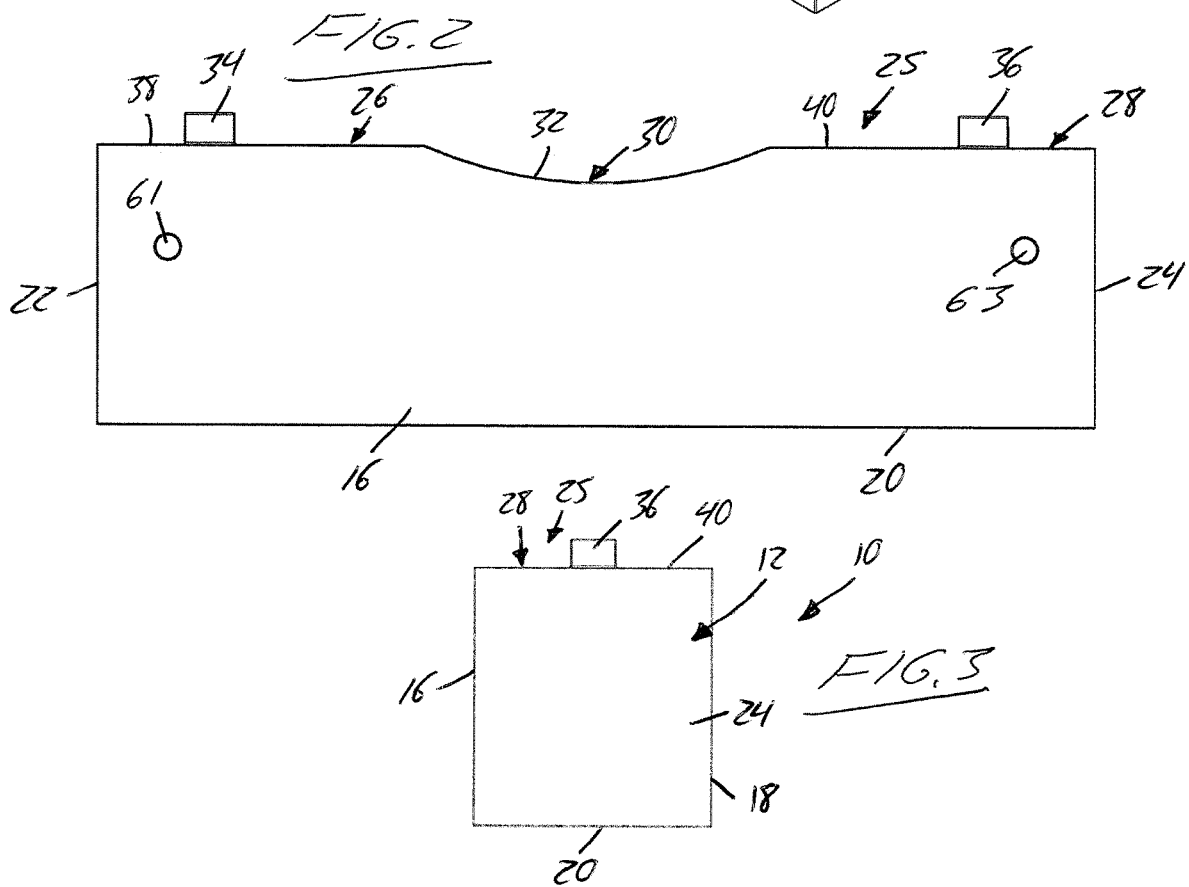

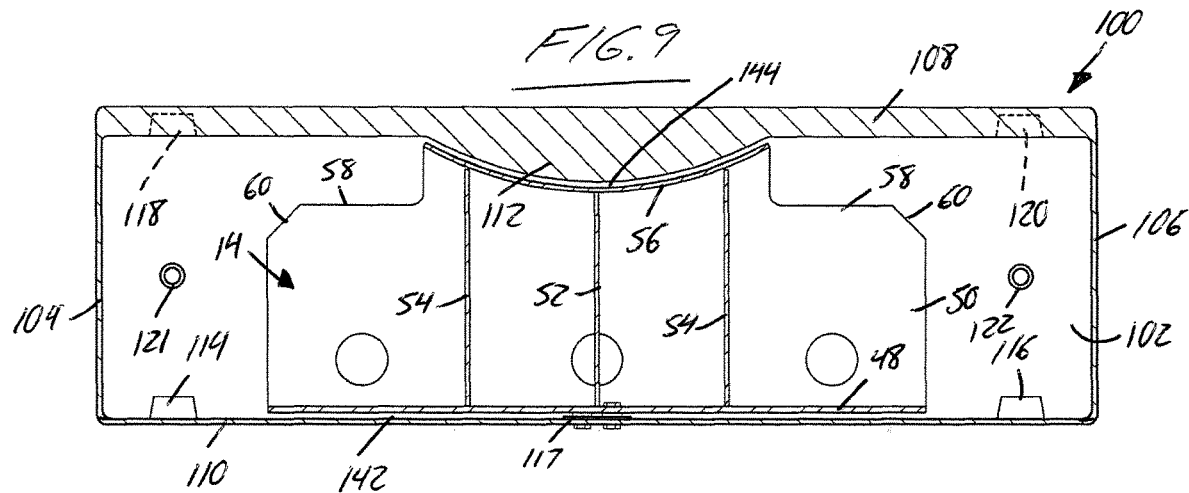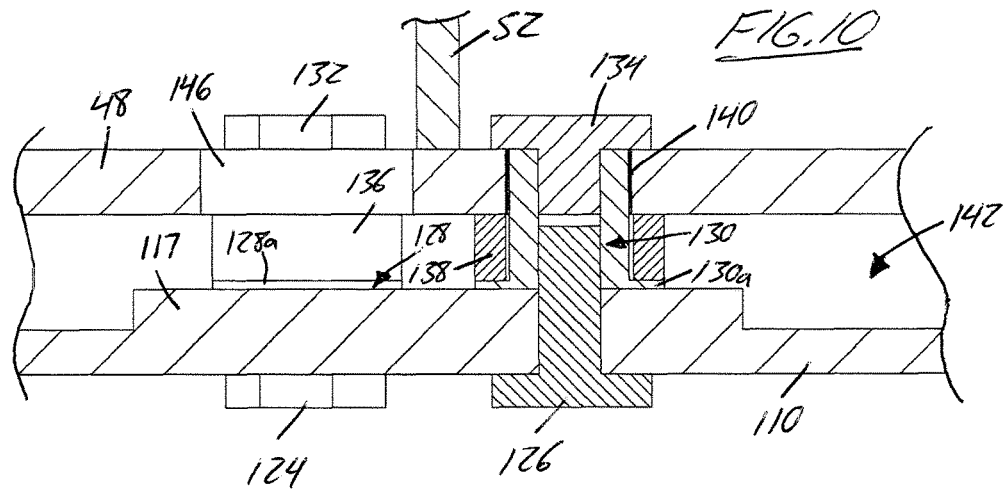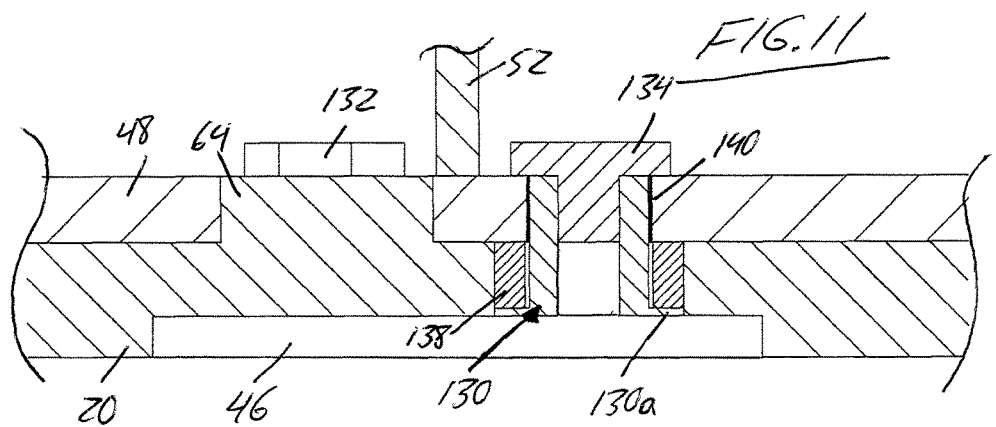

COMPOSITE PIPELINE SLEEPER WITH HOLLOW OUTER SHELL AND RIGID INTERNAL REINFORCEMENT

FIELD OF THE INVENTION

The present invention relates to pipeline sleepers for supporting pipelines in elevated relation above the ground.

BACKGROUND

Oil pipelines have been known to rely on timber sleepers, for example of the same type used as railway ties, to support the pipeline in elevated relation above the underlying ground surface. Shortcomings of timber sleepers include a short lifespan, heavy equipment and manpower requirements, environmental impact (creosote content), and degradation over time.

Accordingly, there remains a need for improvements and alternatives in the field of pipeline sleepers.

SUMMARY OF THE INVENTION

According to one aspect of the invention, there is provided a composite pipeline sleeper comprising:
  a rotationally molded outer shell;
  an internal reinforcement structure that is disposed within, is materially distinct from, and is more rigid than, said rotationally molded outer shell;
  wherein a topside of said pipeline sleeper comprises a cradle-shaped area for seated receipt of a pipe there atop.

Preferably, there is unoccupied air space between the rotationally molded outer shell.

Preferably, the internal reinforcement structure comprises a metal construction.

Preferably, the internal reinforcement consists only of said metal construction.

Preferably, the internal reinforcement structure comprises a lower base seated atop an interior floor of the rotationally molded outer shell.

Preferably, the cradle-shaped area is defined by a topside area of the rotationally molded outer shell, which is underlaid by a conformingly shaped section of the internal reinforcement.

Preferably, the conformingly shaped section of the internal reinforcement comprises a cradle-shaped member having a concave topside overlaid by the topside area of the rotationally molded outer shell.

Preferably, the internal reinforcement structure comprises a plurality of upright plates, at least some of which lie in cross-wise relation to one another.

Preferably, said plurality of upright plates comprises at least one longitudinal plate lying in which cradle-shaped area is concavely curved, and a plurality of stiffening plates lying cross-wise to said longitudinal plate.

Preferably, the sleeper comprises threaded inserts by which the internal reinforcement structure was supportable in a rotational mold during production the pipeline sleeper.

Preferably, the internal reinforcement structure comprises at least one mold-through hole therein at which the internal reinforcement structure is engaged by molded material of the rotationally molded outer shell.

Preferably, the rotationally molded outer shell comprises upwardly protruding features at a topside thereof, and compatibly-shaped cavities at an underside of the rotationally molded outer shell at aligned positions below the upwardly projecting features to enable receipt of the upwardly projecting features in the compatibly-shaped cavities of a matching second pipeline sleeper stacked atop the pipeline sleeper.

Preferably, there are one or more through-bores passing through the outer shell to enable lifting of the pipeline sleeper by engagement of lifting aids through said through-bores.

Preferably, each through-bore penetrates only the rotationally molded outer shell, and not the internal reinforcement structure.

Preferably, each through-bore is delimited by a respective through-tunnel of the rotationally molded outer shell.

According to another aspect of the invention, there is provided a method of producing a composite pipeline sleeper, said method comprising rotationally molding an outer shell of said pipeline sleeper in surrounding relation to an internal reinforcement structure that is materially distinct from, and more rigid than, said outer shell.

Preferably, before rotationally molding said outer shell, the method includes assembling said internal reinforcement structure at least partially from a plurality of metal plates.

Preferably, before rotationally molding said outer shell, the method includes removably fastening the internal reinforcement structure to a rotational mold in a position maintaining gap spaces between walls of the mold and surfaces of the internal reinforcement structure to accommodate flow of molten material into said gap spaces during the rotational molding to create walls of the outer shell around said internal reinforcement structure.

Preferably, said fastening comprises engaging a first threaded insert fastener with a threaded mold fastener, lowering a hole in the internal reinforcement structure over the threaded insert fastener, and securing said internal reinforcement structure to threaded insert fastener.

Preferably, said first threaded insert fastener comprises a female insert fastener and the mold fastener comprises a male mold fastener.

Preferably, before lowering the hole in the internal reinforcement structure over the female insert fastener, the method includes installing a spacer over said female insert fastener so that the internal reinforcement structure is seated on said spacer when lowered over the female insert fastener.

Preferably, securing said internal reinforcement structure to threaded insert fastener comprises engaging a second insert fastener to the first insert fastener.

BRIEF DESCRIPTION OF THE DRAWINGS

One embodiment of the invention will now be described in conjunction with the accompanying drawings in which:

FIG. 1 is a front perspective view of a composite pipeline sleeper of the present invention, featuring a hollow outer shell and an internal reinforcement structure.

FIG. 2 is a front elevational view of the pipeline sleeper of FIG. 1.

FIG. 3 is an end elevational view of the pipeline sleeper of FIG. 1, the opposing end view being identical thereto.

FIG. 9 is a cross-sectional view of a mold that contains the internal reinforcement structure of FIG. 8 and is used to rotationally mold the outer shell, the mold and internal core being sectioned along the same plane as FIG. 6.

FIG. 10 is an enlarged partial cross-section of the mold and internal reinforcement structure of FIG. 9, but cross-sectioned in the plane denoted by line X-X of FIG. 6.

FIG. 11 is an enlarged partial cross-section of the finished pipeline sleeper of FIG. 6, as viewed in the same plane as FIG. 10.

DETAILED DESCRIPTION

Figure 12:
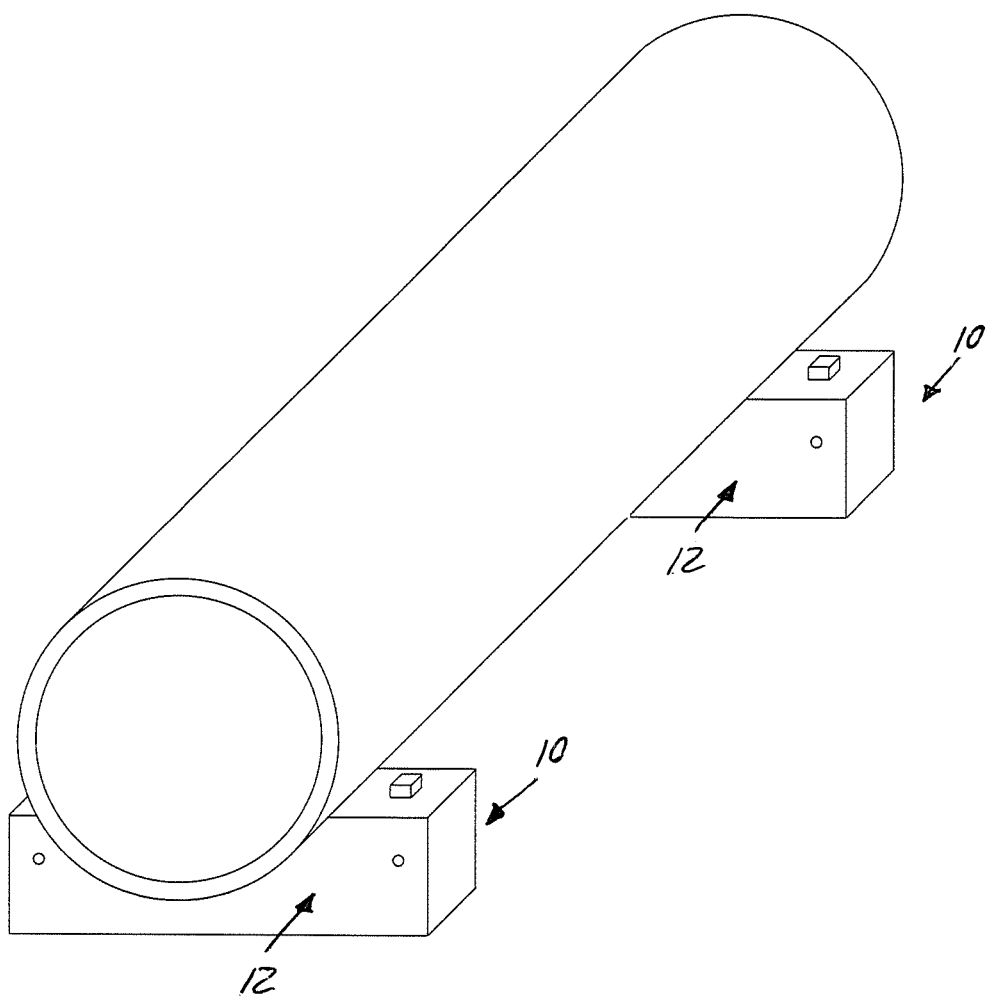
FIG. 12 shows use of two pipeline sleepers of the present invention to support a section of a pipeline.

The appended drawings illustrate a composite pipeline sleeper according to one embodiment of the present invention. The sleeper 10 features a hollow, plastic, rotationally-molded outer shell 12 and an internal reinforcement structure 14 contained therein. In the use of the sleeper, as shown in FIG. 12, the internal reinforcement structures bears the weight of a pipeline section placed atop the sleeper during construction of a pipeline, while the outer shell 12 protects the internal structure 14 from environmental exposure to maximum the lifespan of the sleeper.

The shell 12 has a pair of opposing, parallel and matching front and rear walls 16, 18 standing vertically and perpendicularly upright from a horizontal bottom wall 20 of the shell. The bottom wall 20 is of elongated rectangular shape, with the front and rear walls spanning along the two longer perimeter edges of the rectangular bottom wall. A pair of opposing, parallel and matching left and right end walls 22, 24 also stand vertically and perpendicularly upright from the bottom wall 20, but at the two shorter perimeter edges thereof so as to span between and perpendicularly interconnect the front and rear walls of the shell.

A topside 25 of the shell 12 features a pair of matching and substantially flat top walls 26, 28 each spanning between the front and rear walls at upper ends thereof in opposite and parallel relation to the bottom wall. In addition to being joined to the front and rear walls, each substantially flat top wall 26, 28 is also joined to a respective one of the end walls 22, 24 at an upper end thereof. Disposed centrally between the two substantially flat top walls 26, 28 is an upwardly concave top wall 30 that likewise spans between the front and rear walls 16, 18 at the upper ends thereof. This upwardly concave top wall 30 has an arcuate curvature in a longitudinal direction of the sleeper, i.e. the direction thereof spanned by the front and rear walls 16, 18 of the shell in parallel relation to the elongated sides of the rectangular bottom wall. Each end of the upwardly concave top wall 30 joins with a respective one of the substantially flat top walls 26, 28 at an inner end thereof opposite the respective end wall 22, 24. The end walls 22, 24 and substantially flat top walls 26, 28 are rectangular in shape. The upwardly concave top wall 30 thus resides centrally of the sleeper's topside 25, with the two substantially flat top walls 26, 28 disposed symmetrically across the upwardly concave top wall 30. The curved shape of this upwardly concave top wall 30 creates a central, cradle-shaped area at the topside 25 of the sleeper for receiving the convex underside of a pipeline section in seated relation atop the outer shell 12 of the sleeper, as shown in FIG. 12.

The front and rear shell walls 16, 18 deviate from an otherwise rectangular shape only by the presence of a centrally located and arcuately concave segment 32 in the upper perimeter edges of the front and rear walls, where these upper perimeter edges deviate from an otherwise linear form to conform with the curvature of the upwardly concave top wall 30. The two substantially flat top walls 26, 28 are referred to as such because they are each planar in form over a substantial majority area thereof, and only deviate from such planar form at a respective male protrusion 34, 36 standing upright from a surrounding planar remainder 38, 40 of the wall. Each male protrusion 34, 36 resides at a location situated centrally between the front and rear shell walls 16, 18 and longitudinally outward from the upwardly concave top wall 30 toward the respective end wall 22, 24 of the shell. The upwardly concave top wall 30 resides in recessed elevation relative to the two substantially flat top walls 26, 28, whereby these upper male protrusions 34, 36 denote the uppermost points of both the shell and the overall sleeper.

Figure 4:
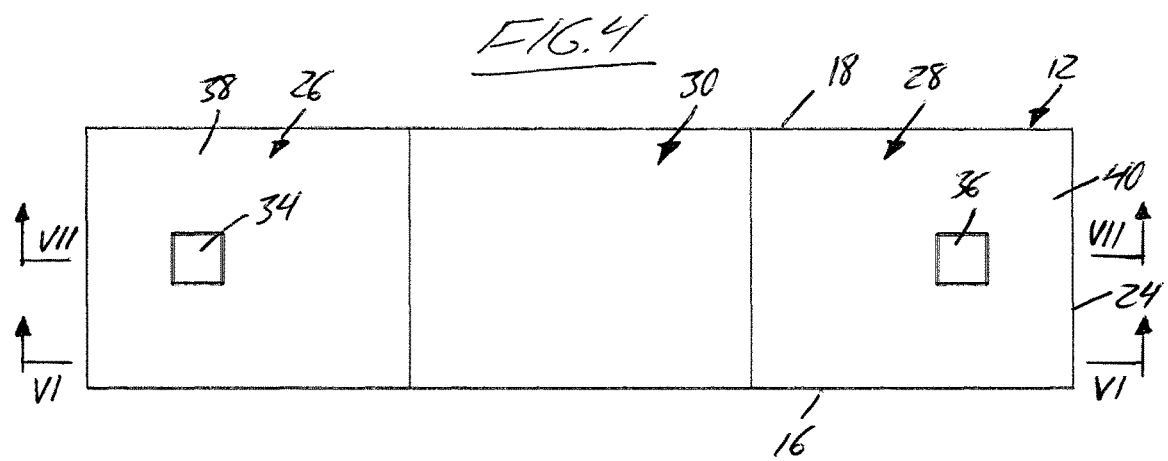
FIG. 4 is a top plan view of the pipeline sleeper of FIG. 1.
Figure 5:
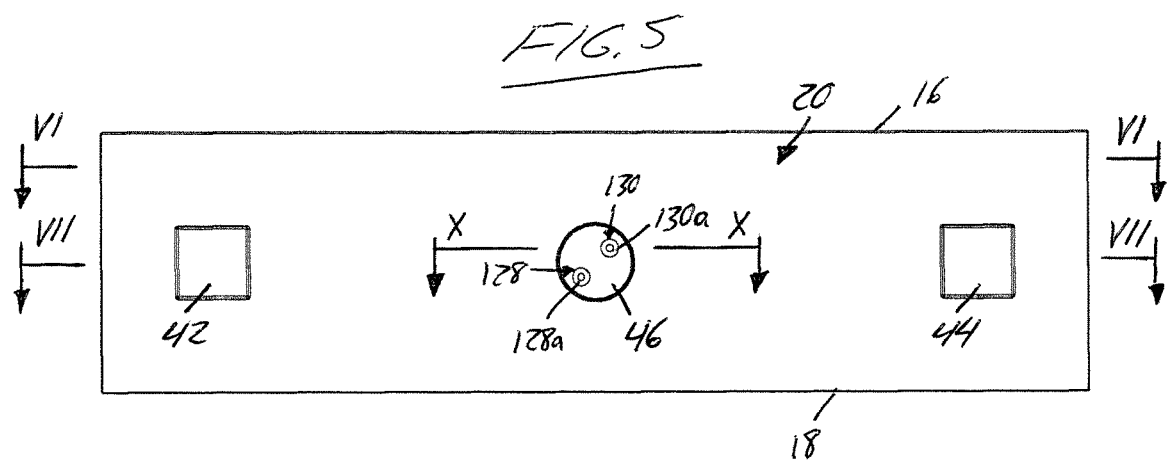
FIG. 5 is a bottom plan view of the pipeline sleeper of FIG. 1.
Figure 6:
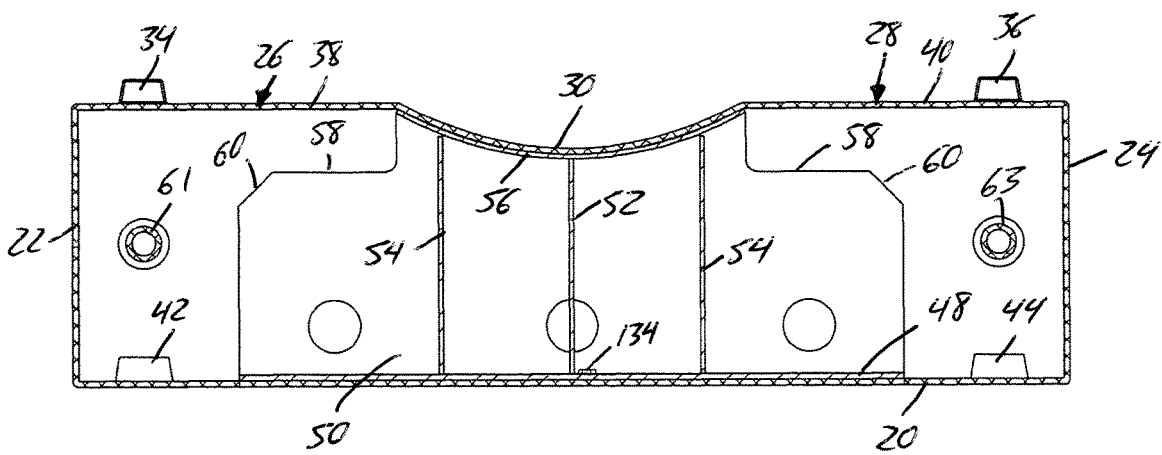
FIG. 6 is a cross-sectional view of the pipeline sleeper of FIG. 5 as viewed along line VI-VI thereof.
Figure 7:
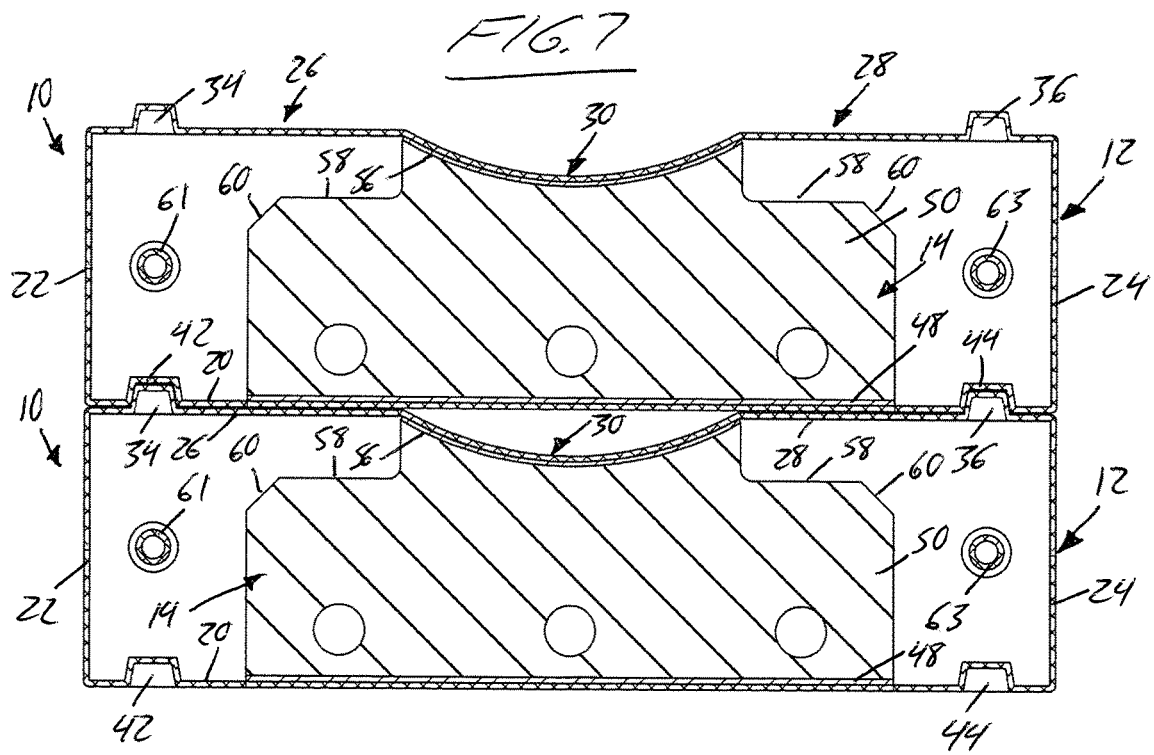
FIG. 7 is a cross-sectional view of two stacked pipeline sleepers, as would be seen if sectioned along line VII-VII of FIG. 5.

With reference to FIG. 5, at the underside of the sleeper, the bottom surface of the bottom wall 20 is also planar over a substantial majority thereof, with the exception of three upwardly recessed areas, namely two outer female cavities 42, 44 residing centrally between the front and rear walls at longitudinally outward locations aligning with the topside protrusions 34, 36, and a central recess 46 residing centrally between the front and rear walls and centrally between the end walls 22, 24. The female cavities 42, 44 are compatibly sized and sized to accommodate insertion of the aligned topside protrusions 34, 36 of a second matching pipeline sleeper during placement of the second matching pipeline sleeper in stacked relation atop the first, as shown in FIG. 7. This mating of male protrusions at the topside of the lower sleeper with the aligned female cavities at the underside of the upper sleeper stabilizes such stacked organization of sleepers during storage and transport, without interfering with flush seating of each sleeper's bottom wall 20 flat atop a ground surface when the sleeper is in use to support a pipeline section in elevated relation over such ground surface, as shown in FIG. 12.

Figure 8A:
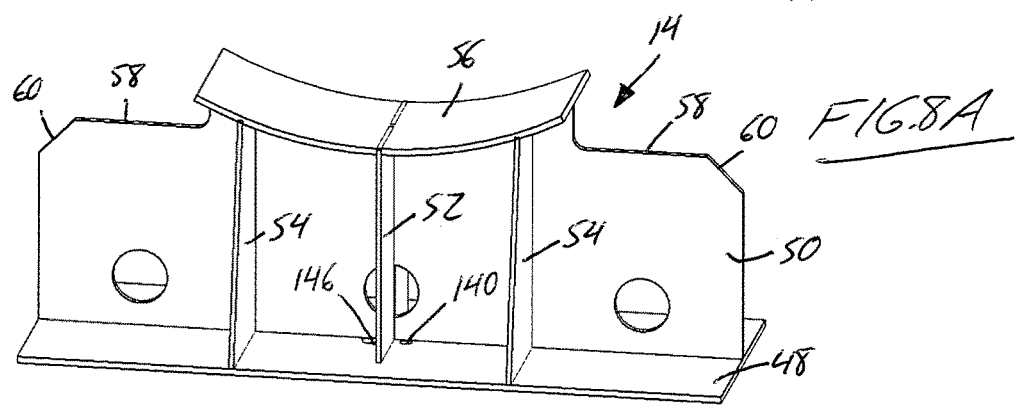
FIG. 8A is an isolated front perspective view of the internal core of the pipeline sleeper of FIG. 1.
Figure 8B:
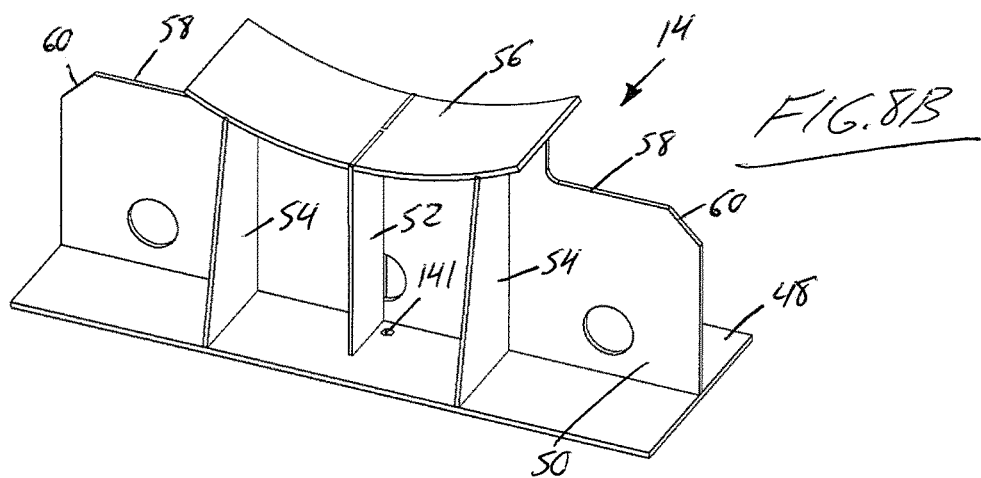
FIG. 8B is an isolated rear perspective view of the internal core of FIG. 8A.

Having described the hollow outer shell 12, attention is now turned to the internal reinforcement structure 14 contained therein, which is shown in isolation in FIGS. 8A and 8B. In the illustrated embodiment, the structure 14 is formed by a welded assembly of metal plates, thus having notably greater rigidity and load bearing strength than the hollow, polymeric outer shell 12. The reinforcement structure 14 features a flat lower base plate 48 that resides horizontally atop the bottom wall 20 of the shell 12. The base plate 48 has an elongated rectangular shape whose direction of elongation matches that of the shell's bottom wall, but whose is length is lesser than said bottom wall of the shell. The entirety of the base plate 48 resides between the two longitudinally spaced cavities 42, 44 of the shell's bottom wall. The base plate 48 thus stops short of the two end walls 22, 24 of the outer shell and occupies a less than full length of the shell's hollow interior space in the longitudinal direction. On the other hand, the width of the structure's base plate 48 and the width of the shell's bottom wall, both measured in a transverse direction perpendicular to the longitudinal direction, may be equal to one another such that the base plate 48 occupies a full width of the shell's hollow interior space in this transverse direction between the front and rear walls 16, 18 of the shell 12.

A flat longitudinal plate 50 stands perpendicularly and vertically upward from the base plate 48, and spans either a full or substantially full length thereof at a transverse center thereof midway between the front and rear walls 16, 18 of the shell 12. A plurality of flat stiffening plates also stand perpendicularly and vertically upward from the base plate 48, but lie in the transverse direction so as to perpendicularly intersect the longitudinal plate 50 in cross-wise relation thereto. The stiffening plates are divided into two sets, each residing on a respective side of the longitudinal plate 50. Each set features a central stiffening plate 52 residing at a longitudinal center of the base plate midway between the end walls of the shell, and a pair of outer stiffening plates 54 arranged symmetrically on opposing sides of the central stiffening plate 52. The two sets of stiffening plates are identical, and reside in alignment with one another across the longitudinal plate 50. The stiffening plates are affixed to both the base plate 48 and the longitudinal plate 50 by welding, thereby stabilizing the upright position of the longitudinal plate 50 relative to the base plate 48.

A top edge of the longitudinal plate 50 has an arcuately-concave segment, the lowermost point of which overlies the longitudinal center of the base plate, and which curves concavely and symmetrically upward from this lowermost point in both longitudinal directions. The outer stiffening plates 54 are taller than the central stiffening plates 50 so that the top ends of the outer stiffening plates 54 are be coterminous with the longitudinal plate 50 near the upper ends of the concave edge segment thereof, while the top ends of the central stiffening plates 52 are coterminous with the longitudinal plate 50 at the lowermost point of the concave edge segment thereof. The structure 14 also features a cradle shaped member 56 defined by an arcuately curved plate supported atop the longitudinal and stiffening plates. The cradle shaped member 56 possess an upwardly concave and downwardly convex curvature, the latter of which conforms to the upwardly concave edge segment of the longitudinal plate 50 of the structure, and the former of which conforms to a convex underside of the shell's upwardly concave top wall 30. Like the upwardly concave top wall 30 of the shell, the cradle shaped member 56 of the internal structure 14 is curved in the longitudinal direction, but linear in the transverse direction.

The concave top wall 30 at the topside 25 of the shell 12 thus sits conformingly atop the cradle shaped member 56 of the internal reinforcement structure 14 so that the weight load of any pipe laid atop the concave topside area of the shell is transferred to the internal reinforcement structure 14, and not to the plastic front, rear and end walls of the shell. The weight load is transferred from the cradle member 56 down to the base plate 48 through the flat upright plates 50, 52. 54, and then through the bottom wall 20 of the shell 12 to the ground surface atop which the sleeper is seated during use.

Moving longitudinally outward from the concave segment that underlies the concave top wall of the shell, the longitudinal plate's top edge steps down to lower elevations at outer segments 58 thereof that underly the substantially flat top walls 26, 28 of the outer shell, where load bearing function is not required. From these outer segments 58 of lower elevation, the top edge of the longitudinal plate 50 then angles downwardly again at outer top corners 60 of the longitudinal plate, from which the plate's perimeter edge then runs vertically downward to the base plate 48 at the respective longitudinal ends thereof.

Situated outwardly beyond the internal reinforcement structure 14 in the longitudinal direction, are two tunnels 61, 63 of the outer shell that each span across the interior space of the shell in the transverse direction between the front and rear walls thereof. Each of these internal tunnels 61, 63 resides between a respective end of the internal reinforcement structure 14 and the nearest end wall 22, 24 of the outer shell 12, for example at a matching longitudinal position to the male protrusion 34, 36 and matching female cavity 42, 44 near this respective end of the outer shell. Each tunnel 61, 63, as part of the rotationally molded shell structure, is seamlessly integral with the front and rear walls 16, 18 to which it connects. Each tunnels delimits a respectively through-bore passing transversely and fully through the shell 12 from the front side thereof to the opposing rear side thereof. Lifting aids such as chains, ropes, pipes, rods or bars can be temporarily passed through these tunnel bores for use of these aids as gripping features by which workers can better handle the sleepers during loading, transport, unloading and pipeline setup, particularly since the plastic shells may be slippery when exposed to rainfall or other moisture.

All walls, projections, cavities/recesses, and tunnels of the outer shell are seamlessly joined together in integral fashion at all intersecting boundaries thereof, thereby forming a singular, unitary outer shell enclosing a hollow interior space of the shell on all sides thereof. Enclosed within the polymeric outer shell, the metal of the reinforcement structure 14 is protected from the elements to prevent oxidation. Since the exterior of the sleeper is defined by a hollow rotationally moulded shell, the shell's interior space exceeds that of the reinforcement structure, and leaves unoccupied air spaces between the internal reinforcement structure and the shell, except at the partial areas of the shell's topside and bottom wall that are occupied by the cradle shaped member 56 and base plate 48 of the internal reinforcement structure 14. This may provide notable savings in material weight and material costs compared to molding of a solid-block plastic exterior that would conformingly encapsulate the metal reinforcement structure in a gapless manner.

Having described the finished structure of the composite sleeper, attention is now turned to the manufacture thereof. FIG. 9 shows a mold 100 having parallel and opposing front and rear walls, of which the rear wall is shown at 102; parallel and opposing left and right end walls 104, 106; and parallel and opposing top and bottom walls 108, 110. The same directional convention is used as for the finished sleeper product, in that the end walls of the mold are separated in the longitudinal direction, and the front and rear walls are separated in the transverse direction perpendicular thereto. The top, front, rear and ends walls of the mold form a removable upper half of the mold than can be engaged and disengaged from the bottom wall of the mold, which thus defines the cooperating lower half of the mold. When the top half is engaged to the bottom half to close the mold, the six walls span respective sides of a generally cuboidal interior space of the mold.

The interior surfaces of the mold walls facing into the interior space are substantially planar, with the exception of a convex bulge 112 that spans a full width of the top mold wall 108 and is centered thereon in the longitudinal direction in order to form the upwardly concave top wall 30 of the shell 12 during the rotational molding process; a pair of outer male protrusions 114, 116 on the bottom mold wall 110 at outboard locations situated near, but spaced inwardly from, the end mold walls 104, 106 at the transverse center of the mold interior to form the two female cavities 42, 44 of the shell 12 during the rotational molding process; a raised plateau 117 on the bottom mold wall 110 at the longitudinal and transverse center thereof to form the central recess 46 of the shell's bottom wall 20 during the rotational molding process; and a pair of female cavities 118, 120 in the top mold wall 108 at matching outboard locations to form the two upper male protrusions 34, 36 of the shell 12 during the rotational molding process. A set of pipes and/or rods 121, 122 span the mold interior in the transverse direction between the front and rear mold walls at matching outboard locations at an intermediate elevation between the top and bottom mold walls to create the tunnels 61, 63 of the shell 12 during the rotational molding process.

To prepare for the rotational molding process, the mold is opened by removing the top half to reveal full access to the topside of the bottom mold wall 110, which defines the interior floor of the mold. With reference to FIG. 10, at the raised plateau 117, a pair of threaded male screw or bolt fasteners 124, 126 penetrate the bottom wall 110 of the mold at positions situated diagonally from one another across the longitudinal and transverse center point of the mold floor. The threaded studs of these screws/bolts thus stand perpendicularly upright from the interior floor of the mold. These male fasteners are referred to as mold fasteners to distinguish them from other fasteners that cooperate therewith to secure the internal reinforcement structure 14 to the mold 100. Said other fasteners include a pair of threaded female sleeve fasteners 128, 130, another pair of threaded male screw or bolt fasteners 132, 134, and a pair of spacer washers 136, 138. The female sleeve fasteners 128, 130, second set of male fasteners 132, 134 and spacer washers 136, 138 are referred to as insert fasteners, as they end up being molded-in-place components (inserts) of the finished sleeper product, whereas the mold fasteners 124, 126 end up being removed during removal of the finished sleeper from the mold. Each sleeve fastener 128, 130 features an internally threaded cylindrical body that is flanged and one end thereof, thus resembling a top-hat with a threaded axial through-bore.

Once the mold 100 is opened to reveal access to the mold floor and the upwardly protruding shafts of the mold fasteners 124, 126, the sleeve fasteners 128, 130 are threaded onto the threaded studs of the mold fasteners 124, 126 in a flange-down orientation, and tightened thereon until the flanges 128*a*, 130*a* of the sleeve fasteners 128, 130 become seated on the mold floor at the raised plateau 117 thereof. The axial length of the sleeve fasteners 128, 130 exceeds the distance by which the screw/bolt studs project upwardly from the mold floor, and so the cylinder of each fully tightened sleeve fastener reaches upwardly beyond the top end of the respective screw/bolt stud. Each spacer washer 136, 138 is then placed over a respective one of the sleeve fasteners so as to rest atop the flange of the sleeve fastener in circumferential relation around the internally threaded cylinder thereof. The axial length of the sleeve fastener cylinder exceeds that of the spacer washer 136, 138, whereby the sleeve cylinder projects upwardly beyond the seated spacer washer.

The base plate 48 of the internal reinforcement structure 14 features a pair of mounting holes 140, 141 situated therein at diagonally opposite positions across the longitudinal and transverse center point of the base plate 48, where the longitudinal plate 50 is intersected by the two central stiffening plates 52. The spacing between these mounting holes 140, 141 equals the spacing between the two mold fasteners 124, 126. Accordingly, the internal reinforcement structure 14 is lowered into the open mold in centrally aligned relation over the mold floor in order to lower the two mounting holes 140, 141 of the base plate 48 over the sleeve fastener cylinders at the top ends thereof that protrude upwardly from the spacer washers 136, 138. The outer diameter of the spacer washers 136, 138 exceeds the diameter of the mounting holes 140, 141 in the base plate 48. The base plate 48 of the internal reinforcement structure 14 is thus seated atop the spacer washers 136, 138 rather than directly atop the mold floor, whereby the spacer washers 136, 138 maintain a lower gap space 142 between the base plate 48 and the mold floor. The reinforcement structure is then secured in this centered and slightly elevated position above the mold floor by threading of the male insert fasteners 132, 134 into the top ends of the internally threaded cylinders of the sleeve fasteners 128, 130 through the mounting holes 140, 141 in the base plate 48.

With the internal reinforcement structure fastened in this centered and elevated position over the mold floor, the mold is closed by attaching the upper mold half to the structure-supporting bottom half of the mold, resulting in the ready status of the mold shown in FIG. 9. As shown in the figure, the radius of curvature of the convex bulge 112 of the top mold wall 108 is slightly lesser than the radius of curvature of the concave topside of the cradle member 156 of the internal reinforcement structure. Additionally, the interior height of the mold at the center point thereof, from the raised plateau 117 of the mold floor to the lowermost apex of the convex bulge 112, is greater than the of the internal structure's height at the center point thereof (from the underside of the base plate 48 to the lowermost point of the cradle member's concave topside) by an amount exceeding the combined thickness of the sleeve fastener flanges and spacer washers. As a result an upper gap space 144 is left between the concave topside of the cradle member 156 and the convex bulge 112 of the mold's top wall.

During the rotational molding process, molten plastic material is introduced to the interior space of the mold, and the mold is rotated, during which the flowable molten plastic coats the interior surfaces of the mold walls so as to form the respective walls of the sleeper's shell once hardened. Likewise, the molten plastic coats the pipes and/or rods 122 of the mold to form the two tunnels 61, 63 of the finished sleeper shell. The upper gap space 144 between the concave cradle member 156 and the convex bulge 112 in the top mold wall 108 creates the concave top wall 30 of the finished shell, which thus lies in flush conforming contact with the concave topside of the cradle member 156. The lower gap space 142 between the base plate 48 creates the portion of the shell's bottom wall 120 that underlies the base plate 48 to protect the internal reinforcement structure 14 from seated exposure to the ground during use of the finished sleeper. Once the rotational molding process is complete, and the molten plastic has hardened into the shell 12 of the finished sleeper product 10, the mold is opened and the mold fasteners 124, 126 are removed in order to release the finished sleeper from the mold.

In addition to the mounting holes 140, 141 used to temporarily fasten the internal reinforcement structure 14 to the mold 100, the base plate 48 of the illustrated embodiment also features a mold-through hole 146 situated near the center thereof. This hole 146 is visible in FIGS. 8A and 10, the later of which shows how this mold-through hole 146 overlies the raised plateau 117 of the mold floor when the reinforcement structure 14 is fastened thereto. FIG. 11 shows the same cross-sectional area of the internal reinforcement structure 14 of FIG. 10, but after removal of the finished sleeper from the mold 100. Here, it can be seen that the hardened plastic of the shell's bottom wall 20 not only circumferentially envelopes the flanged bottom end of each sleeve fastener 128, 130 and the spacer washer 136, 138 disposed thereon, but also includes a raised area 64 that has hardened in place within the mold-through hole 146 of the base plate 48. In addition to the conformingly curved abutment between the cradle shaped member 156 and the concave top shell wall 30, this setting of the polymeric shell 12 in a state encompassing insert fasteners of the internal reinforcement structure and engaging at least one mold-through hole 146 therein contributes to retention of the heavier internal reinforcement structure at a fixed, static position inside the polymeric outer shell.

The inclusion of a raised plateau 117 in the mold floor serves to create the central recess 46 in the underside of the shell's bottom wall 20, and the fastening of the internal reinforcement structure 14 to the mold specifically at this raised plateau 117 results in the insert-molded sleeve fasteners 128, 130 and spacer washers 136, 138 being elevated above the lowermost plane of the sleeper (i.e. the plane occupied by the flat substantial majority of the bottom shell wall's underside). Accordingly, the insert molded-fasteners are kept out contact with the ground on which the majority area of the bottom shell wall is seated during use of the sleeper, thus minimizing opportunity for moisture seepage into the shell interior, and thus better preventing oxidation of the metal reinforcement structure therein. As shown in FIG. 11, the top end of each insert-molded sleeve fastener 128, 130 is closed off by the respective male insert fastener 132, 134 that remains engaged therewith from atop the base plate 48. The bottom end of each sleeve fastener 132, 134 or the entirety of the central recess 46 in the underside of the shell's bottom wall 20, may be fitted with a plug or patched with a filler material to even further weatherproof the interior space of the shell and the reinforcement structure contained therein.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A composite pipeline sleeper comprising:
a rotationally molded outer shell having a hollow interior space;
an internal reinforcement structure that is disposed within said hollow interior space, and that is materially distinct from, and more rigid than, said rotationally molded outer shell;
wherein a topside of said pipeline sleeper comprises a cradle-shaped area for seated receipt of a pipe there atop, the hollow interior space of the rotationally molded outer shell exceeds the internal reinforcement structure in volume, and the hollow interior space includes unoccupied air space between the internal reinforcement structure and the rotationally molded outer shell at areas thereof other than said cradle-shaped area.

2. The composite pipeline sleeper of claim 1 wherein the internal reinforcement structure comprises a metal construction.

3. The composite pipeline sleeper of claim 2 wherein the internal reinforcement consists only of said metal construction.

4. The composite pipeline sleeper of claim 1 wherein the internal reinforcement structure comprises a lower base seated atop an interior floor area of the rotationally molded outer shell, and said areas at which there exits said unoccupied air space between the internal reinforcement structure and the rotationally molded outer shell exclude both said cradle shaped area and said interior floor area.

5. The pipeline sleeper of claim 1 wherein the cradle-shaped area is defined by a topside area of the rotationally molded outer shell, which is underlaid by a conformingly shaped section of the internal reinforcement.

6. The pipeline sleeper of claim 5 wherein the conformingly shaped section of the internal reinforcement comprises a cradle-shaped member having a concave topside overlaid by the topside area of the rotationally molded outer shell.

7. The pipeline sleeper of claim 1 comprising threaded inserts by which the internal reinforcement structure was supportable in a rotational mold during production the pipeline sleeper.

8. The pipeline sleeper of claim 1 wherein the internal reinforcement structure comprises at least one mold-through hole therein at which the internal reinforcement structure is engaged by molded material of the rotationally molded outer shell.

9. The pipeline sleeper of claim 1 wherein the rotationally molded outer shell comprises upwardly protruding features at a topside thereof, and compatibly-shaped cavities at an underside of the rotationally molded outer shell at aligned positions below the upwardly projecting features to enable receipt of the upwardly projecting features in the compatibly-shaped cavities of a matching second pipeline sleeper stacked atop the pipeline sleeper.

10. The pipeline sleeper of claim 1 comprising one or more through-bores passing through the outer shell to enable lifting of the pipeline sleeper by engagement of lifting aids through said through-bores.

11. The pipeline sleeper of claim 10 wherein each through-bore penetrates only the rotationally molded outer shell, and not the internal reinforcement structure.

12. The pipeline sleeper of claim 10 wherein each through-bore is delimited by a respective through-tunnel of the rotationally molded outer shell.

13. A composite pipeline sleeper comprising:
a rotationally molded outer shell;
an internal reinforcement structure that is disposed within, is materially distinct from, and is more rigid than, said rotationally molded outer shell;
wherein:
a topside of said pipeline sleeper comprises a cradle-shaped area for seated receipt of a pipe there atop; and
the internal reinforcement structure comprises a plurality of upright plates, at least some of which lie in cross-wise relation to one another.

14. The pipeline sleeper of claim 13 wherein said plurality of upright plates comprises at least one longitudinal plate lying in which cradle-shaped area is concavely curved, and a plurality of stiffening plates lying cross-wise to said longitudinal plate.

15. A method of producing the composite pipeline sleeper of claim 1, said method comprising rotationally molding said outer shell of said pipeline sleeper in surrounding relation to said internal reinforcement structure that is materially distinct from, and more rigid than, said outer shell.

16. The method of claim 15 comprising, before rotationally molding said outer shell, removably fastening the internal reinforcement structure to a rotational mold in a position maintaining gap spaces between walls of the mold and surfaces of the internal reinforcement structure to accommodate flow of molten material into said gap spaces during the rotational molding to create walls of the outer shell around said internal reinforcement structure.

17. The method of claim 16 wherein said fastening comprises engaging a first threaded insert fastener with a threaded mold fastener, lowering a hole in the internal reinforcement structure over the threaded insert fastener, and securing said internal reinforcement structure to threaded insert fastener.

18. The method of claim 17 wherein said first threaded insert fastener comprises a female insert fastener and the mold fastener comprises a male mold fastener.

19. The method of claim 18 comprising, before lowering the hole in the internal reinforcement structure over the female insert fastener, installing a spacer over said female insert fastener so that the internal reinforcement structure is seated on said spacer when lowered over the female insert fastener.

20. The method of claim 17 wherein securing said internal reinforcement structure to threaded insert fastener comprises engaging a second insert fastener to the first insert fastener.

21. A composite pipeline sleeper comprising:
a rotationally molded outer shell;
an internal reinforcement structure that is disposed within, is materially distinct from, and is more rigid than, said rotationally molded outer shell;
wherein:
a topside of said pipeline sleeper comprises a cradle-shaped area for seated receipt of a pipe there atop; and
the pipeline sleeper comprises threaded inserts by which the internal reinforcement structure was supportable in a rotational mold during production the pipeline sleeper.

\* \* \* \* \*